US011062405B2

(12) United States Patent
Nagata et al.

(10) Patent No.: US 11,062,405 B2
(45) Date of Patent: Jul. 13, 2021

(54) DYNAMIC ORDERING SYSTEM

(71) Applicant: Toyota Motor Engineering & Manufacturing North America, Inc., Plano, TX (US)

(72) Inventors: Katsumi Nagata, Foster City, CA (US); Divya Sai Toopran, Sunnyvale, CA (US); Shojiro Takeuchi, Saratoga, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 174 days.

(21) Appl. No.: 16/264,344

(22) Filed: Jan. 31, 2019

(65) Prior Publication Data

US 2020/0250771 A1 Aug. 6, 2020

(51) Int. Cl.
*G06Q 50/12* (2012.01)
*H04W 4/02* (2018.01)
*G06Q 30/06* (2012.01)
*G06Q 20/20* (2012.01)
*H04W 4/44* (2018.01)

(52) U.S. Cl.
CPC .......... *G06Q 50/12* (2013.01); *G06Q 20/202* (2013.01); *G06Q 30/0635* (2013.01); *G06Q 30/0639* (2013.01); *H04W 4/023* (2013.01); *H04W 4/44* (2018.02)

(58) Field of Classification Search
None
See application file for complete search history.

(56) References Cited

U.S. PATENT DOCUMENTS

| | | |
|---|---|---|
| 6,643,581 B2 | 11/2003 | Ooishi |
| 7,558,739 B2 | 7/2009 | Thomson |
| 8,259,925 B2 | 9/2012 | Smith et al. |
| 8,732,028 B2 | 5/2014 | Napper |
| 9,170,118 B2 | 10/2015 | Kiyama et al. |
| 9,262,775 B2 | 2/2016 | Lamont |
| 9,299,251 B2 | 3/2016 | Scofield et al. |
| 9,671,230 B2 * | 6/2017 | Sahay ................... G06Q 50/01 |
| 10,107,634 B2 | 10/2018 | You et al. |
| 10,126,144 B2 | 11/2018 | Lucas et al. |
| 10,157,364 B1 * | 12/2018 | Koeppel .............. G06Q 10/083 |

(Continued)

FOREIGN PATENT DOCUMENTS

JP        2010054389        3/2010

*Primary Examiner* — Oluseye Iwarere
(74) *Attorney, Agent, or Firm* — Snell & Wilmer L.L.P.

(57) ABSTRACT

A system for ordering goods via a vehicle includes a location sensor, an input device to receive a first desired consumable order from a first POS, a network access device, and an electronic control unit (ECU) coupled to the location sensor, the input device, and the output device. The ECU is designed to determine or predict a first wait time between ordering the first desired consumable order and a corresponding first desired consumable being available for pickup at the first point of sale, determine a first route time corresponding to an amount of time for the vehicle to travel from the current location of the vehicle to the first point of sale, and control the network access device to transmit the first desired consumable order to the first point of sale when the first wait time is within a predetermined amount of time of the first route time.

20 Claims, 5 Drawing Sheets

(56) References Cited

U.S. PATENT DOCUMENTS

| | | | | |
|---|---|---|---|---|
| 10,328,947 | B1* | 6/2019 | Hansel | B60W 50/045 |
| 10,331,128 | B1* | 6/2019 | Hansel | G05D 1/0061 |
| 10,346,889 | B1* | 7/2019 | Reiss | H04W 4/35 |
| 10,467,559 | B1* | 11/2019 | Svenson | G06Q 30/06 |
| 10,732,634 | B2* | 8/2020 | Yang | G05D 1/0212 |
| 2010/0157848 | A1 | 6/2010 | Das et al. | |
| 2013/0151412 | A1* | 6/2013 | Spahl | G06Q 20/40 705/44 |
| 2013/0198031 | A1* | 8/2013 | Mitchell | G06Q 10/047 705/26.8 |
| 2014/0074743 | A1* | 3/2014 | Rademaker | G06Q 10/083 705/334 |
| 2014/0136414 | A1* | 5/2014 | Abhyanker | G06Q 10/087 705/44 |
| 2014/0180914 | A1* | 6/2014 | Abhyanker | G05D 1/102 705/39 |
| 2016/0035001 | A1* | 2/2016 | Driscoll | G06Q 30/0631 705/26.7 |
| 2016/0247113 | A1* | 8/2016 | Rademaker | G06Q 10/063114 |
| 2016/0321548 | A1* | 11/2016 | Ziskind | G06Q 30/0281 |
| 2016/0363450 | A1* | 12/2016 | Sahay | G06Q 10/06 |
| 2017/0061335 | A1* | 3/2017 | Looman | G08G 1/202 |
| 2017/0061488 | A1 | 3/2017 | Ilminen | |
| 2017/0148324 | A1 | 5/2017 | High et al. | |
| 2017/0161817 | A1* | 6/2017 | Othmer | G06Q 30/0631 |
| 2017/0357916 | A1 | 12/2017 | Shelby et al. | |
| 2018/0158153 | A1* | 6/2018 | Ekin | G06Q 10/06315 |
| 2018/0164818 | A1* | 6/2018 | Wilkinson | G05D 1/0278 |
| 2018/0209803 | A1* | 7/2018 | Rakah | G01C 21/343 |
| 2018/0322546 | A1* | 11/2018 | Ross | G05D 1/0217 |
| 2019/0005565 | A1* | 1/2019 | Hu | G01C 21/3469 |
| 2019/0042986 | A1* | 2/2019 | Furnon | G06Q 10/08 |
| 2019/0061939 | A1* | 2/2019 | Anand | G06Q 10/0835 |
| 2019/0066041 | A1* | 2/2019 | Hance | G05D 1/021 |
| 2019/0130260 | A1* | 5/2019 | Han | G06F 16/487 |
| 2019/0137290 | A1* | 5/2019 | Levy | G01C 21/3461 |
| 2019/0139258 | A1* | 5/2019 | Slattery | H04N 7/181 |
| 2019/0196503 | A1* | 6/2019 | Abari | G06Q 10/063 |
| 2019/0228375 | A1* | 7/2019 | Laury | G01C 21/343 |
| 2019/0266557 | A1* | 8/2019 | Berk | G06Q 10/0832 |
| 2019/0360823 | A1* | 11/2019 | Nelson | G01C 21/3676 |
| 2019/0385121 | A1* | 12/2019 | Waliany | G06Q 10/08355 |
| 2020/0070717 | A1* | 3/2020 | Garden | B60Q 1/2696 |
| 2020/0090226 | A1* | 3/2020 | Garden | G06Q 30/0252 |
| 2020/0111370 | A1* | 4/2020 | Dyer | G08G 1/205 |
| 2020/0151800 | A1* | 5/2020 | Tseng | G01C 21/3697 |
| 2020/0174494 | A1* | 6/2020 | Lessels | B60P 3/20 |
| 2020/0183414 | A1* | 6/2020 | Shih | B60R 25/01 |
| 2020/0394610 | A1* | 12/2020 | Chopra | G06Q 10/0834 |

* cited by examiner

DYNAMIC ORDERING SYSTEM

BACKGROUND

1. Field

The present disclosure relates to systems and methods for dynamic ordering of consumable goods from one or more point of sale.

2. Description of the Related Art

For years, restaurants have allowed diners to pre-order food for dine-in or takeout. This practice began with phone ordering of such food and has advanced to online ordering, such as by accessing a website of the restaurant using a computer. There are times, however, when this practice is undesirable. One such example is that it is undesirable to place an online order while driving a vehicle.

Additionally, some users are now able to order food delivery from various food delivery services, such as GrubHub and Uber Eats. Using these platforms, a user can purchase a meal from a restaurant and provide their address and the food delivery service will deliver the food, for a premium charge.

Neither pre-ordering food for pickup or utilizing a food delivery service is advisable while driving. There are also other drawbacks to ordering of such food. For example, if an order is called in to a restaurant too far in advance, the food may sit on a counter and get cold before being consumed. Likewise, if the order is called in to the restaurant too early, the person picking up the food may have to wait at the restaurant for the food to be prepared which negates the benefits of ordering food ahead of time.

Therefore, it is desirable to develop systems and methods of dynamic ordering of consumable goods by vehicles.

SUMMARY

Described herein is a system for ordering goods via a vehicle. The system includes a location sensor designed to detect a current location of the vehicle. The system further includes an input device designed to receive user input corresponding to a first desired consumable order from a first point of sale. The system further includes a network access device designed to transmit and receive data from a remote device. The system further includes an electronic control unit (ECU) coupled to the location sensor, the input device, and the output device. The ECU is designed to determine or predict a first wait time between ordering the first desired consumable order and a corresponding first desired consumable being available for pickup at the first point of sale. The ECU is further designed to determine or predict a first route time corresponding to an amount of time for the vehicle to travel from the current location of the vehicle to the first point of sale. The ECU is further designed to control the network access device to transmit the first desired consumable order to the first point of sale when the first wait time is within a predetermined amount of time of the first route time.

Also disclosed is a system for ordering goods via a vehicle. The system includes a location sensor designed to detect a current location of the vehicle. The system further includes an input device designed to receive user input corresponding to a first desired consumable order from a first point of sale. The system further includes an output device designed to output data. The system further includes an electronic control unit (ECU) coupled to the location sensor, the input device, and the output device. The ECU is designed to determine or predict a first line time corresponding to an amount of time between arriving at the first point of sale and reaching a sale counter at the first point of sale, and a second line time corresponding to an amount of time between arriving at a second point of sale and reaching a sale counter at the second point of sale, the second point of sale corresponding to a second desired consumable order that is similar to the first desired consumable order. The ECU is further designed to determine or predict a first route time corresponding to an amount of time for the vehicle to travel from the current location of the vehicle to the first point of sale, and a second route time corresponding to an amount of time for the vehicle to travel from the current location of the vehicle to the second point of sale. The ECU is further designed to determine a first total time corresponding to an amount of time from a current time until the first desired consumable may be purchased at the first point of sale based on the first line time and the first route time, and a second total time corresponding to an amount of time from the current time until a second desired consumable corresponding to the second desired consumable order may be purchased at the second point of sale based on the second line time and the second route time. The ECU is further designed to control the output device to output a selection of one of the first point of sale if the first total time is less than the second total time, or the second point of sale if the second total time is less than the first total time. The ECU is further designed to control the output device to output data corresponding to the selection of the first point of sale or the second point of sale.

Also disclosed is a method for ordering goods by components of a vehicle. The method includes detecting, by a location sensor, a current location of the vehicle. The method further includes receiving, by an input device, user input corresponding to a first desired consumable order from a first point of sale. The method further includes determining or predicting, by an electronic control unit (ECU), a first wait time between ordering the first desired consumable order and a corresponding first desired consumable being available for pickup at the first point of sale. The method further includes determining or predicting, by the ECU, a first route time corresponding to an amount of time for the vehicle to travel from the current location of the vehicle to the first point of sale. The method further includes controlling, by the ECU, a network access device to transmit the first desired consumable order to the first point of sale when the first wait time is within a predetermined amount of time of the first route time.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for dynamic ordering of consumable goods from various points of sale by a vehicle. The systems provide several benefits and advantages such as the ability to predict or determine wait times corresponding to an amount of time from ordering a consumable until it is available for pickup. The systems further provide the advantage of predicting or determining an amount of time that a user may spend in line waiting to purchase the consumable. These abilities provide the advantage of allowing the system to wait to submit an order for the consumable until the vehicle is sufficiently close to the point of sale that the consumable may be purchased and picked up before it undesirably cools (if made hot, e.g., pizza) or heats (if made cool, e.g., iced coffee).

The system may further provide the benefit and advantage of allowing the vehicle to query alternative points of sale to find alternative locations that sell the consumable good. This is beneficial because the system can predict which point of sale will require the least amount of time for the user to reach the point of sale and purchase the good, thus saving time for the user.

An exemplary system includes a location sensor to detect a current location of the vehicle and an input device to receive an order of a consumable good at a corresponding point of sale. The system further includes a network access device that can communicate with devices associated with multiple points of sale. The system also includes an electronic control unit (ECU) coupled to the location sensor, the input device, and the network access device. The ECU may determine a first wait time between placing the order and the consumable being ready for pickup, along with a first route time that it will take the vehicle to get from the current location to the first point of sale. The ECU may further control the network access device to transmit the order to the point of sale when the first wait time is within a predetermined amount of time from the first route time.

The ECU may likewise query alternative points of sale to determine whether a total time, from ordering to pickup (or from ordering to returning home), is less at the first point of sale or at an alternative point of sale. If the total time is less for the alternative point of sale then the ECU may transmit the order to the alternative point of sale. The ECU may further control an output device to output a location of, or directions to, the selected point of sale, or may control the vehicle to travel to the selected point of sale.

Figure 1:
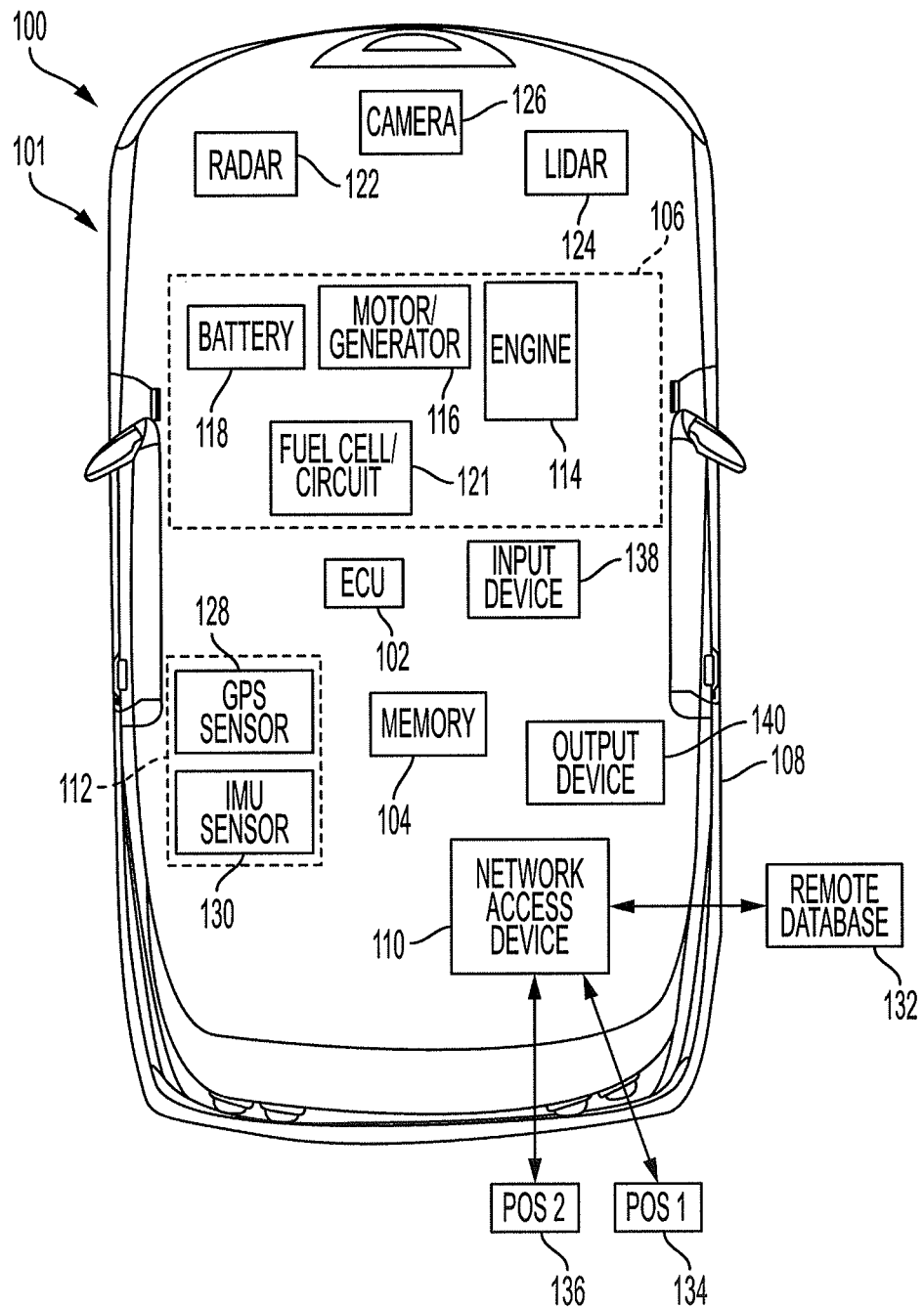
FIG. 1 is a block diagram illustrating a vehicle that includes a system for dynamic ordering of consumable goods from points of sale according to an embodiment of the present invention.

Turning to FIG. 1, a vehicle 100 includes a system 101 for dynamically ordering consumables, such as food or beverage, from a point of sale (POS). The system 101 may be implemented in the vehicle 100 or may be included in a mobile device, such as a smartphone.

The vehicle 100 (or system 101) may include an ECU 102, a memory 104, a power source 106, and a main body 108. The vehicle 100 (or system 101) may further include a network access device 110, a location sensor 112, a radar sensor 122, a light imaging and ranging (lidar) sensor 124, and a camera 126. The vehicle may also include an input device 138 and an output device 140.

The main body 108 may be propelled along a roadway, may be suspended in or on water, or may fly through air. The main body 108 may resemble a vehicle such as a car, a motorcycle, a boat, an aircraft, or the like. The main body 108 may further support an individual such as a driver, a passenger, or the like.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be used as a rideshare vehicle in an autonomous, semi-autonomous, or fully driver-operated state. In that regard, the vehicle 100 may be operated independently of driver control and, occasionally, without a person inside of the vehicle 100. For example, the vehicle 100 may place (or receive notification of placement of) an order of a consumable to one or more POS. The ECU 102 may control the vehicle to pick up the consumable at the time at which it is available for pickup so that the consumable remains hot (or cold). The ECU 102 may then control the vehicle to deliver the food to a destination after the consumable has been placed in the vehicle.

The memory 104 may include any non-transitory memory and may store data usable by the ECU 102. For example, the memory 104 may store historical wait times at one or more POS, may store instructions usable by the ECU 102 to submit an order for a desired consumable to one or more POS, may store instructions usable by the ECU 102 to drive autonomously, or the like.

The power source 106 may include any one or more of an engine 114, a motor-generator 116, a battery 118, or a fuel-cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage devices including a battery, a flywheel, a super capacitor, a thermal storage device, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The radar sensor 122, the lidar sensor 124, and the camera 126 may detect data corresponding to an environment of the vehicle 100. For example, one or more of these sensors may detect the presence of objects near the vehicle 100, may detect a distance between the vehicle 100 and a leading or following vehicle, or the like. The ECU 102 may use this detected data to autonomously control the vehicle 100, to identify landmarks (such as one or more POS), or the like.

The network access device 110 may transmit and receive messages from one or more remote device. The network access device 110 may include any network access device capable of communicating via a wireless protocol. For example, the network access device 110 may communicate via Bluetooth, Wi-Fi, a cellular protocol, vehicle to vehicle communications, Zigbee, or any other wireless protocol. The network access device 110 may communicate with a remote database 132 that may store information such as historical wait times at one or more POS, consumable goods available at one or more POS, locations of one or more POS, or the like.

The network access device 110 may further communicate with remote devices associated with one or more POS including a first POS 134 and a second POS 136. For example, the network access device 110 may receive information corresponding to current wait times at the first POS 134 and the second POS 136, available consumables at the first POS 134 and the second POS 136, store hours of the first POS 134 and the second POS 136, a predicted wait time at a future point in time at the first POS 134 and the second POS 136, or the like.

The input device 138 may include any one or more input device such as a button, a keyboard, a mouse, a touchscreen, a microphone, or the like. The input device 138 may receive input from a user of the vehicle 100 such as a driver or a passenger.

The output device 140 may include any output device such as a speaker, a display, a touchscreen, or the like. The output device 140 may output data to a user of the vehicle.

As mentioned above, the system 101 may be directly implemented in the vehicle (i.e., the components may be installed in the vehicle 100) or may be implemented in a user device (such as a laptop, a tablet, a smart phone, or the like).

The components of the system 101 may be used to order one or more consumable from the first POS 134 or the second POS 136 in a dynamic fashion. For example, the input device 138 may receive user input corresponding to a desired consumable order. The desired consumable order may include a list of one or more desired consumables to be purchased from the first POS 134 or the second POS 136.

The ECU 102 may receive the desired consumable order from the input device 138. The ECU 102 may determine various times that corresponds to a pickup of the desired consumable. For example, the ECU 102 may determine a route time that corresponds to an amount of time for the vehicle 100 to travel to the first POS 134 and the second POS 136. The ECU 102 may further determine a wait time corresponding to an amount of time between the consumable order being placed and the consumable being available for pickup at the first POS 134 and the second POS 136. The ECU 102 may further determine a line time that corresponds to an amount of time that a user would wait in line at the first POS 134 and the second POS 136 (i.e., a time between arriving at the corresponding POS and reaching a sale counter). The ECU 102 may further determine a postponed line time that corresponds to an amount of time that a user would wait in line at the first POS 134 and the second POS 136 when arriving at a later point in time (i.e., a time between arriving at the later point in time and reaching the sale counter).

The ECU 102 may take further actions regarding the first POS 134 and the second POS 136. For example, the ECU 102 may control the network access device 110 to submit the order to the corresponding POS 134, 136, may select one of the first POS 134 or the second POS 136 to submit the order based on one or more time, may control the vehicle 100 to travel to the first POS 134 or the second POS 136, or the like.

Figure 2A:
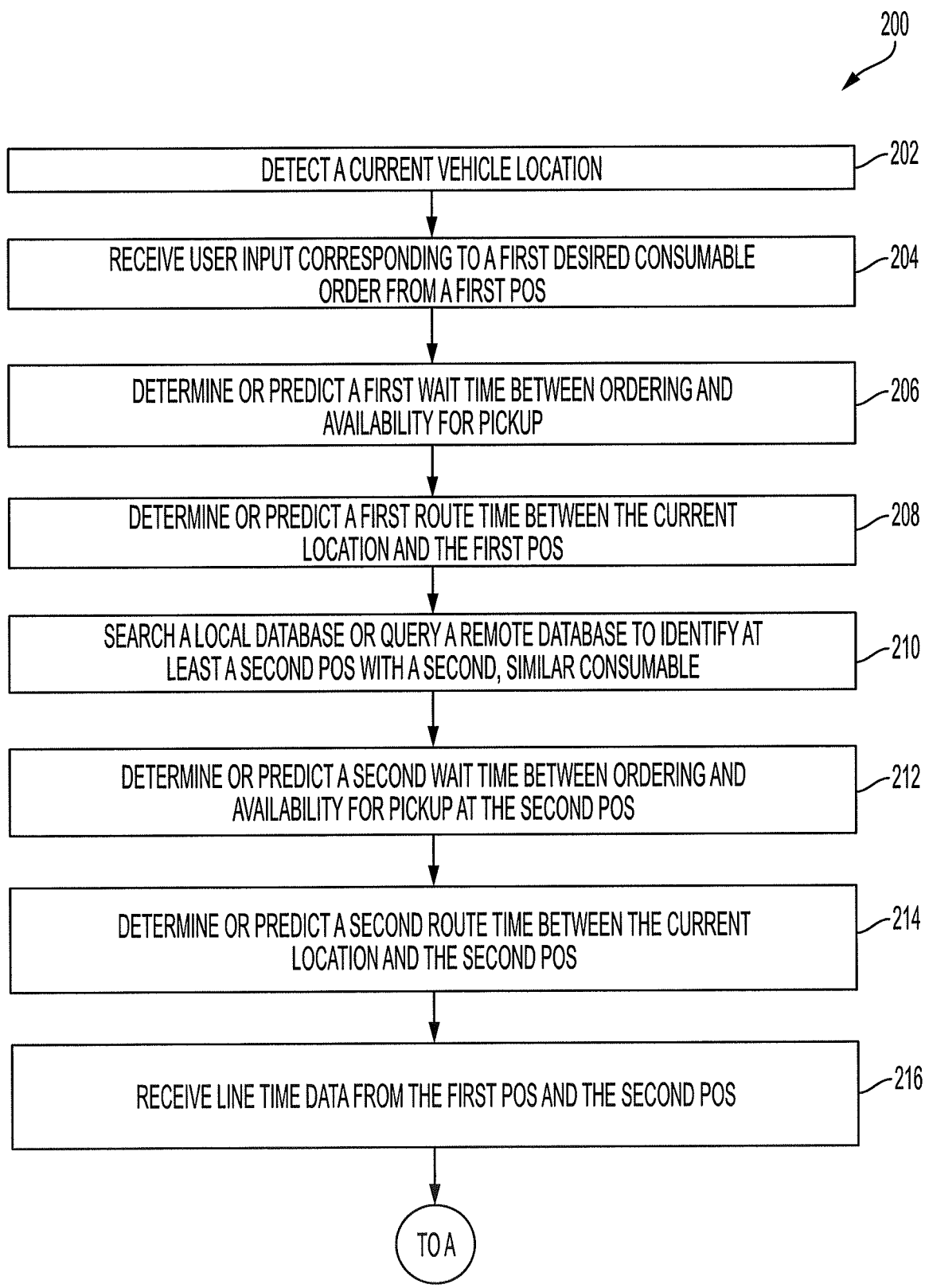
FIGS. 2A, 2B, and 2C are flowcharts illustrating an exemplary method for dynamic ordering of consumable goods from points of sale according to an embodiment of the present invention.
Figure 2B:
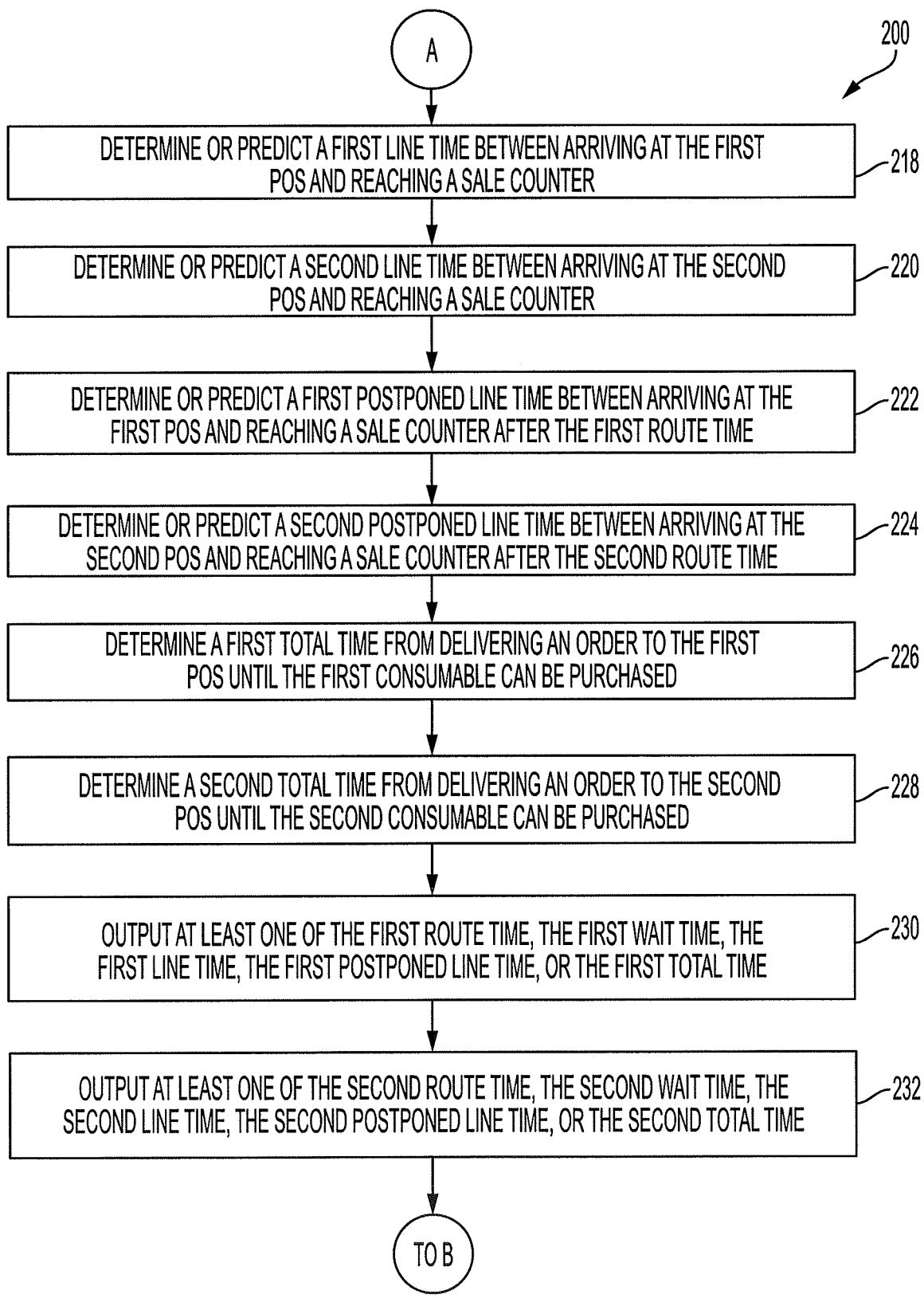
Figure 2C:
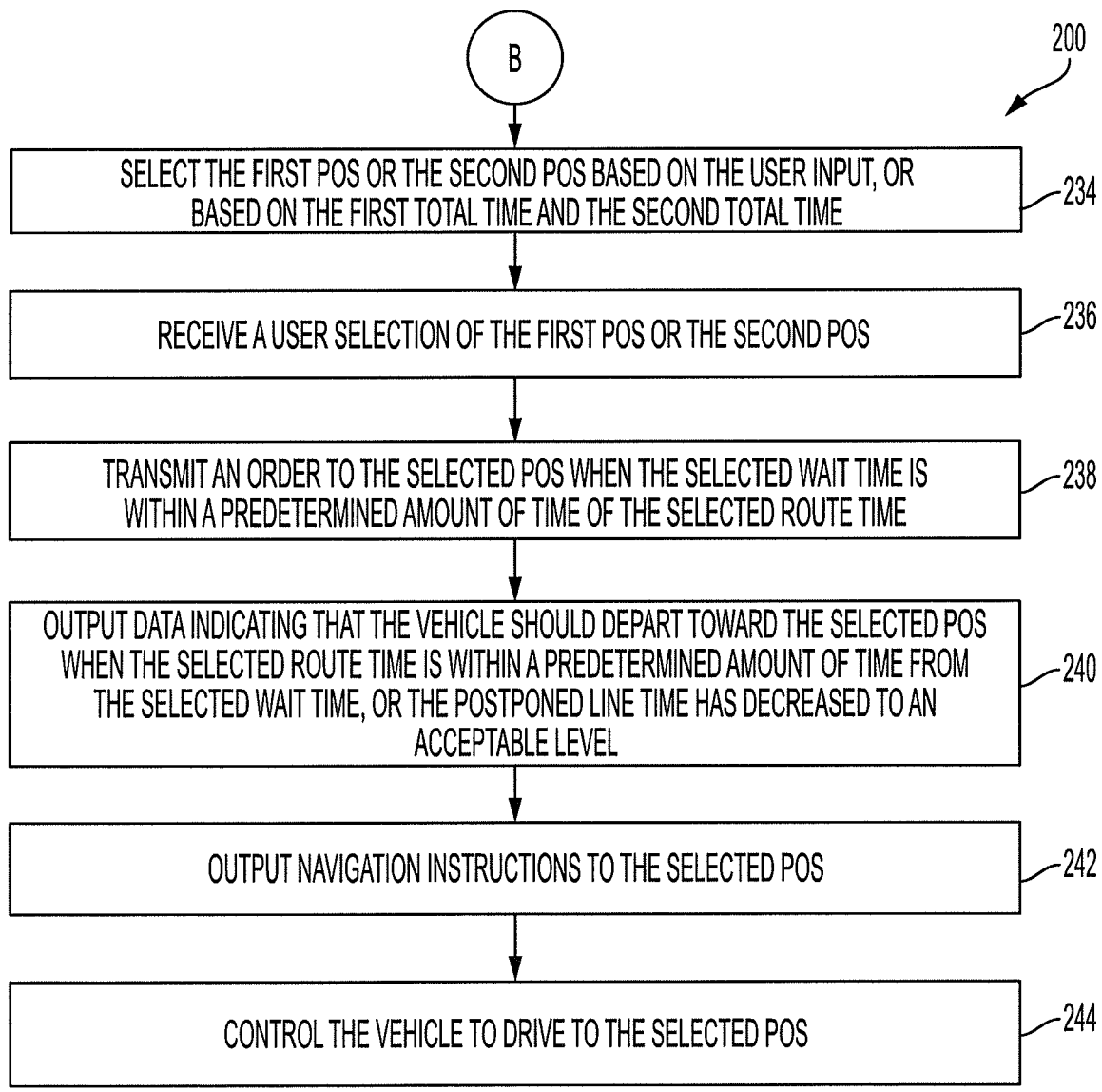

Referring now to FIGS. 2A, 2B, and 2C, a method 200 for dynamically ordering consumable goods, such as food and beverage, using a system similar to the system 101 of FIG. 1 is shown. In block 202, one or more location sensor of the vehicle may detect a current location of the vehicle. For example, the current location may include GPS coordinates, a location of the vehicle relative to one or more landmark, a location of the vehicle on a roadmap, or the like.

In block 204, an input device may receive user input corresponding to a first desired consumable order from a first POS. For example, a user may type or speak a desired consumable to be ordered along with a desired POS from which to pick up the order. The desired consumable order may include food, beverage, or any other consumable good. The desired POS may include a specific POS location such as "the Starbucks on 15th St.," or a generic POS location such as "Starbucks" or "a coffee shop."

In block 206, the ECU may determine or predict a first wait time between ordering the consumable good at the first POS and availability of the consumable good for pickup. The wait time may correspond to an amount of time between the consumable order being placed and the consumable being available for pickup at the first POS. The ECU may determine or predict the first wait time based on data accessed by the ECU in a local or remote database or based on data received by the ECU via a network access device. For example, the ECU may determine or predict the first wait time based on a quantity of cars in line at the first POS, a quantity of customers in line at the first POS, a quantity of pending orders at the first POS, a composition of pending orders at the first POS, a preparation time for the one or more consumable in the order, items contained in the first consumable order, or historical wait time at the first POS.

In some embodiments, the ECU may receive the first wait time from the first POS directly. For example, the first POS may detect data corresponding to the first wait time, or may have a system to predict the first wait time. The first POS may broadcast or otherwise transmit the first wait time (such as in response to a query from the ECU).

In block 208, the ECU may determine or predict a first route time between the current location of the vehicle and the first POS. For example, the ECU may determine or predict the first route time based on traffic information, a distance between the current location and the first POS, historical travel times along segments of the route, speed limits along each segment of the route, the presence of stoplights or stop signs along the route, or the like.

In block 210, the ECU may search a local database or query a remote database to identify at least a second POS that offers a second consumable that is similar to the desired consumable. In some embodiments, the ECU may instead query each potential POS to determine whether the potential POS offers a similar consumable. In some embodiments, the local or remote database may include information indicating whether each potential POS sells a similar consumable. The ECU may select or query any quantity of POSs to query about wait or other times.

In some embodiments, a similar consumable may correspond to the same consumable item from the same restaurant chain. For example, if the first desired consumable order includes a mocha cappuccino from a first Starbucks then the second consumable may likewise include a mocha cappuccino from a second Starbucks. In some embodiments, a similar consumable may correspond to a similar item at the same restaurant chain or at a different restaurant chain. For example, if the first desired consumable order includes a mocha cappuccino from a first Starbucks then the second consumable order may include a mocha cappuccino from a second Starbucks, a Peet's coffee, a local coffee chain, or the like. In some embodiments, a user may be capable of providing input corresponding to a desired mode of operation (such as determining whether the ECU only queries the same chain or whether different chains are acceptable).

The ECU may select a second POS that is within a predetermined distance of the current location of the vehicle or within a predetermined location of the first POS. For example, the predetermined distance may be within twice a current distance between the current location and the first POS, three times a current distance between the current location and the first POS, 5 miles from the current location, or the like. A user may be able to provide input indicating a preferred predetermined distance. In some embodiments, rather than a predetermined distance, the ECU may select a second POS that is within a predetermined amount of travel time from the current vehicle location or from the first POS. For example, the predetermined amount of travel time may correspond to twice the amount of travel from the current location to the first POS, within a 10 minute drive of the current location, or the like.

The ECU may select multiple secondary POSs within the predetermined distance. For example, the ECU may select each secondary POS that fits within the mode of operation (the same chain only or different chains acceptable) and is within the predetermined distance (or the predetermined amount of travel time).

In block 212, the ECU may determine or predict a second wait time corresponding to an amount of time between ordering the consumable from the second POS and availability of the consumable at the second POS. This determination or prediction may be performed in a similar manner as in block 206 for the first POS.

In block 214, the ECU may determine or predict a second route time corresponding to an amount of time for the vehicle to travel from the current location to the second POS. This determination or prediction may be performed in a similar manner as in block 208 for the first POS.

In block 216, the ECU may receive line time data from the first POS and from the second POS. The line time data may be received via the network access device from one or more device associated with the POS, from one or more device associated with a customer of the POS, from a local database, from a remote database, or the like. For example, sensors at each POS may detect the line time data, one or more employee at each POS may upload the line time data, one or more customer may upload the line time data, one or more sensor associated with a customer device (such as a camera on a smart phone) may upload the line time data, or the like. The line time data may include one or more of a quantity of cars in a drive-through line, a quantity of customers in a walk-up line, a quantity of pending orders, a historical line time, or the like.

In block 218, the ECU may determine or predict a first line time that corresponds to an amount of time between arriving at the first POS and reaching a sale counter. The ECU may determine or predict the first line time based on the line time data received in block 216. In some embodiments, the ECU may receive the first line time from the first POS directly. For example, the first POS may detect data corresponding to, or have a system to predict, the first line time. The first POS may broadcast or otherwise transmit the line time (such as in response to a query from the ECU).

In block 220, the ECU may determine or predict a second line time that corresponds to an amount of time between arriving at the second POS and reaching a sale counter. The ECU may determine or predict the second line time in a similar manner as the first line time in block 218. In some embodiments, the ECU may determine or predict the first line time in a first fashion (such as a received line time) and determine or predict the second line time in a second fashion (such as historical line time data).

In block 222, the ECU may determine or predict a first postponed line time that corresponds to an amount of time between arriving at the first POS and reaching a sale counter at a point in time after expiration of the first route time (or at another later time). For example, the ECU may determine or predict the first postponed line time based on the line time data obtained in block 216. The first postponed line time may be determined or predicted in a similar manner as the first line time in block 218 or in a different manner.

In block 224, the ECU may determine or predict a second postponed line time that corresponds to an amount of time between arriving at the second POS and reaching a sale counter at a point in time after expiration of the second route time (or at another later time). The second postponed line time may be determined or predicted in a similar manner as the first postponed line time in block 222.

In block 226, the ECU may determine, calculate, or predict a first total time from submission of the first consumable order to the first POS until the first consumable may be purchased at the first POS. The first total time may be determined, calculated, or predicted based on one or more of the first route time, the first wait time, the first line time, or the first postponed line time. For example, the first total time may be calculated by summing (the maximum of the first route time or the first wait time) with the first line time. In some embodiments, the ECU may only calculate one or a few times (such as the first route time, the first wait time, the first line time, or the first postponed buying time). In that regard, the total time may be equal to a sum of the first route time and the first line time, a sum of the first route time and the first postponed line time, a sum of the first wait time and the first line time, or the like.

In block 228, the ECU may determine, calculate, or predict a second total time from submission of the second consumable order to the second POS until the second consumable may be purchased at the second POS. The second total time may be determined, calculated, or predicted in a similar manner as the first total time in block 226.

In some embodiments, the ECU may output data corresponding to the various times using an output device, and the user may select a desired POS at which to submit the order for the desirable consumable. In that regard and in block 230, the ECU may control the output device to output one or more of the first route time, the first wait time, the first line time, the first postponed line time, or the first total time. Similarly, in block 232, the ECU may control the output device to output one or more of the second route time, the second wait time, the second line time, the second postponed line time, or the second total time.

In some embodiments and in block 234, the ECU may make a selection of the first POS or the second POS based on the times corresponding to the first POS and the second POS. For example, the ECU may select whichever of the first POS or the second POS has the lowest total time. In some embodiments, the ECU may further calculate the total times based on an amount of time required to travel to the next destination (such as to return home or to the office), and the ECU may select the first POS or the second POS based on this additional calculation (e.g., by selecting the POS which allows the user to return home in the shortest amount of time).

In some embodiments and in block 236, the ECU may receive a user selection from the input device of the first POS or the second POS. In that regard, a user may compare the times for the first POS and for the second POS and make a selection based on an amount of time which may be saved.

In some embodiments, the route time may be greater than the wait time (or a sum of the wait time and the line time). In that regard, the vehicle may begin traveling (either autonomously or by driver control) to the selected POS prior to submitting the order to the selected POS. In block 238, when the wait time (or a sum of the wait time and the line time or the postponed line time) is within a predetermined amount of time of the selected route time, the ECU may control the network access device to submit the order for the desired consumable to the selected POS. The predetermined amount of time may correspond to an amount of time at which the desired consumable is unlikely to cool or heat by an undesirable amount before being purchased by the user. For example, the predetermined amount of time may be one minute, three minutes, five minutes, or the like. In some embodiments, a queuing time may be added to the order processing time in the consideration of the route time and/or the wait time.

In some embodiments, the route time may be less than the wait time (or a sum of the wait time in the line time). In that regard, the order may be placed before the vehicle begins traveling to the selected POS. In block 240, the ECU may output data (such as via an output device or to a mobile device associated with a user) indicating that the vehicle should begin traveling towards the POS.

In some embodiments, the postponed line time may correspond to an unacceptable amount of time. The unacceptable amount of time may be selected by the ECU or may be provided by a user of the vehicle. For example, the unacceptable amount of time may correspond to a wait time of 10 minutes, 20 minutes, 30 minutes, or the like. In some embodiments, the unacceptable amount of time may correspond to the total time that exceeds store operation hours. In some embodiments, the unacceptable amount of time may correspond to a wait to be seated at a sit-down restaurant such that the vehicle can submit a reservation request to the sit-down restaurant. In that regard, once the postponed line time line time reaches or drops below the unacceptable wait time then the ECU may control the output device to output data indicating that the vehicle should begin traveling towards the POS.

As mentioned above, the vehicle may be autonomous or non-autonomous. In that regard and in block 242, if the vehicle is nonautonomous (or if the user decides to drive the autonomous vehicle non-autonomously) then the ECU may control the output device to output navigation instructions to the selected POS.

In block 244, if the vehicle is autonomous then the ECU may control the vehicle to maneuver the vehicle to the selected POS.

Figure 3:
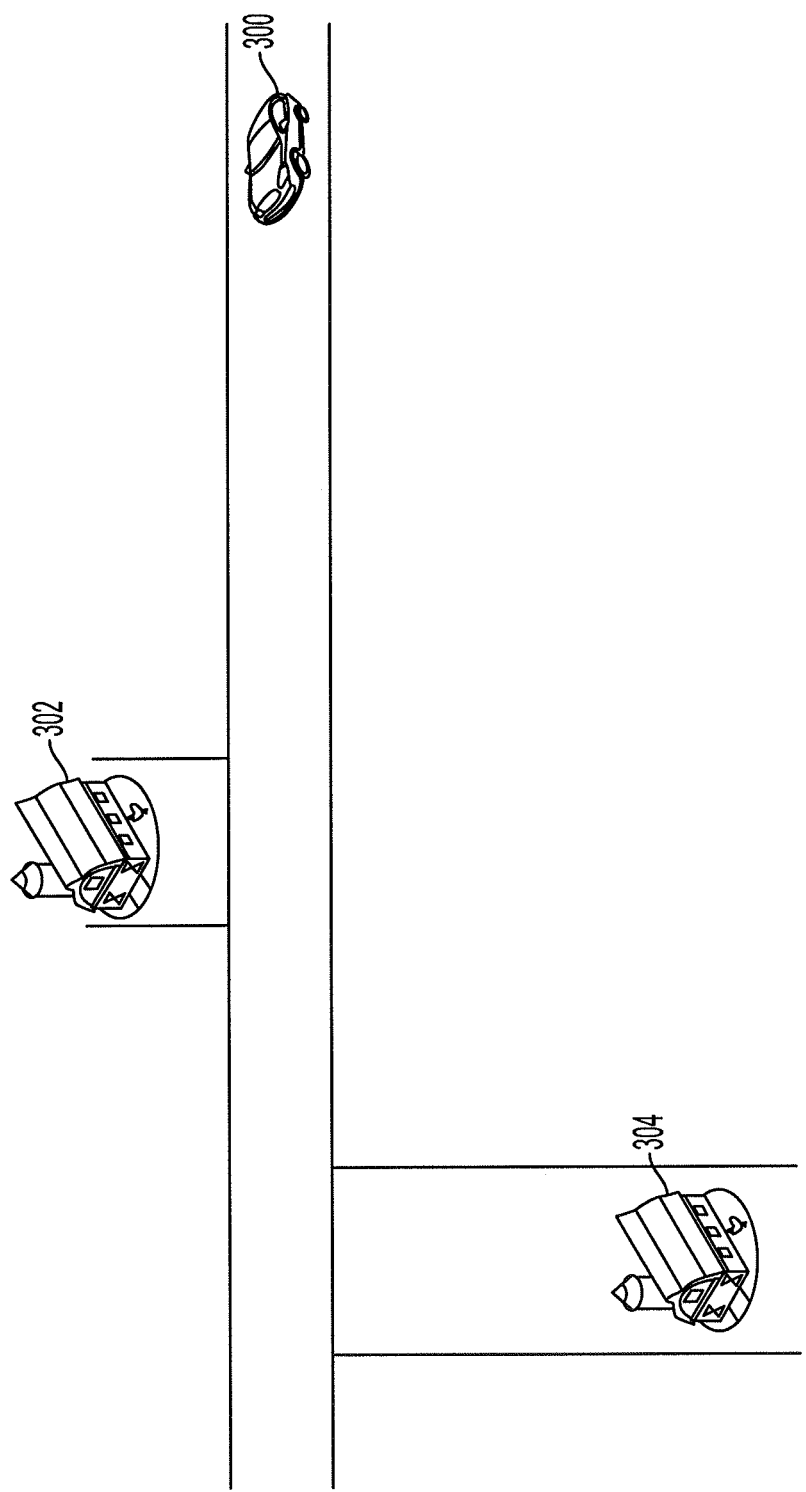
FIG. 3 is a drawing illustrating an exemplary use of the method of FIGS. 2A, 2B, and 2C by a vehicle having similar features as FIG. 1 according to an embodiment of the present invention.

Referring now to FIG. 3, an implementation of the method 200 of FIGS. 2A, 2B, and 2C is shown. A vehicle 300 (having similar features as the vehicle 100 of FIG. 1) may be traveling along a roadway and may include a system capable of performing the functions of the method 200. A driver of the vehicle 300 may use an input device to provide input indicating a desired consumable good. The driver may further provide a desired POS, such as a first POS 302.

The ECU of the vehicle 300 may determine or calculate one or more of a route time from the current location of the vehicle 300 to the first POS 302, a wait time at the first POS 302, a line time at the first POS 302, a postponed line time at the first POS 302, or a total time at the first POS 302.

The ECU of the vehicle 300 may further query a local or remote database to identify a second POS 304 that sells a similar consumable good. For example, the first POS 302 and the second POS 304 may each be a Starbucks, or may be different chains of coffee shops. After identifying the second POS 304, the ECU of the vehicle 300 may determine or calculate one or more of a route time from the current location of the vehicle 300 to the second POS 304, a wait time at the second POS 304, a line time at the second POS 304, a postponed line time at the second POS 304, or a total time at the second POS 304.

As an example, the route time to the first POS 302 may be 10 minutes and the route time to the second POS 304 may be 15 minutes. However, the wait time at the first POS 302 may be 30 minutes and the wait time at the second POS 304 may be 15 minutes. Based on this information, the ECU may select the second POS 304 because the total time to pick up the consumable at the first POS 302 is 40 minutes, while it is 30 minutes at the second POS 304.

As another example, the ECU may be aware that the vehicle 300 is to return to its current location after obtaining the consumable good. Continuing the example, the route times above remain the same but the wait time at the first POS 302 is 15 minutes and at the second POS 304 is likewise 15 minutes. The ECU may select the first POS 302 because the total time is 25 minutes (15 minutes for the consumable to be picked up, and 10 minutes to return home), while the total time for the second POS 304 is 30 minutes (15 to drive there and pick up the consumable, and 15 to drive home).

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for ordering goods via a vehicle, the system comprising:
    a location sensor configured to detect a current location of the vehicle;
    an input device configured to receive user input corresponding to a first desired consumable order corresponding to a first desired consumable from a first point of sale;
    a network access device configured to transmit and receive data from a remote device; and
    an electronic control unit (ECU) coupled to the location sensor, the input device, and the network access device, and configured to:
        determine or predict a first wait time between ordering the first desired consumable order and a corresponding first desired consumable being available for pickup at the first point of sale,
        determine or predict a first route time corresponding to an amount of time for the vehicle to travel from the current location of the vehicle to the first point of sale,
        determine or predict a second wait time corresponding to a second desired consumable order that is similar to the first desired consumable order at a second point of sale,
        determine or predict a second route time corresponding to an amount of time for the vehicle to travel from the current location of the vehicle to the second point of sale,
        receive or determine a selection of the first point of sale or the second point of sale, and
        control the network access device to transmit the first desired consumable order to the first point of sale or transmit the second desired consumable order to the second point of sale based on the selection when at least one of the first wait time is within a predetermined amount of time of the first route time or the second wait time is within a predetermined amount of time of the second route time.

2. The system of claim 1 further comprising an output device configured to output data, wherein the ECU is further configured to:
    control the output device to output the first wait time corresponding to the first desired consumable order at the first point of sale and the first route time;
    control the output device to output the second wait time and the second route time;
    receive the selection of the first point of sale or the second point of sale via the input device; and
    control the network access device to transmit the first desired consumable order to the first point of sale or transmit the second desired consumable order to the second point of sale based on the selection.

3. The system of claim 1 further comprising an output device configured to output data, wherein the ECU is further configured to:
    determine a first total time corresponding to an amount of time from a current time until the first desired consumable is ready and the vehicle can reach the first point of sale based on the first wait time and the first route time, and a second total time corresponding to an amount of time from the current time until a second desired consumable corresponding to the second desired consumable order is ready and the vehicle can reach the second point of sale based on the second wait time and the second route time;
    control the network access device to transmit the first desired consumable order or the second desired consumable order to the selection of:
        the first point of sale if the first total time is less than the second total time, or
        the second point of sale if the second total time is less than the first total time; and
    control the output device to output data corresponding to the selection of the first point of sale or the second point of sale.

4. The system of claim 3 wherein the ECU is further configured to search at least one of a local database or control the network access device to query a remote database to identify the second point of sale based on the first desired consumable order.

5. The system of claim 1 further comprising an output device configured to output data, wherein the ECU is further configured to:
    determine or predict a first line time corresponding to an amount of time between arriving at the first point of sale and reaching a first sale counter at the first point of sale, and a second line time corresponding to an amount of time between arriving at the second point of sale and reaching a second sale counter at the second point of sale;
    determine a first total time corresponding to an amount of time from a current time until the first desired consumable may be purchased at the first point of sale based on the first line time and the first route time, and a second total time corresponding to an amount of time from the current time until a second desired consumable corresponding to the second desired consumable order may be purchased at the second point of sale based on the second line time and the second route time;
    control the network access device to transmit the first desired consumable order or the second desired consumable order to the selection of:
        the first point of sale if the first total time is less than the second total time, or
        the second point of sale if the second total time is less than the first total time; and
    control the output device to output data corresponding to the selection of the first point of sale or the second point of sale.

6. The system of claim 5 wherein the ECU is further configured to:
    receive line time data corresponding to at least one of a quantity of cars in line, a quantity of customers in line, or a quantity of pending orders at each of the first point of sale and the second point of sale via the network access device; and
    determine or predict the first line time and the second line time based on the received line time data.

7. The system of claim 1 further comprising an output device configured to output data, wherein the ECU is further configured to:
- determine or predict a first postponed line time corresponding to an amount of time between arriving at the first point of sale and reaching a first sale counter at the first point of sale after expiration of the first route time;
- determine or predict a second postponed line time corresponding to an amount of time between arriving at the second point of sale and reaching a second sale counter at the second point of sale after expiration of the second route time;
- determine a first total time corresponding to an amount of time from a current time until the first desired consumable may be purchased at the first point of sale based on the first postponed line time and the first route time, and a second total time corresponding to an amount of time from the current time until a second desired consumable corresponding to the second desired consumable order may be purchased at the second point of sale based on the second postponed line time and the second route time;
- make the selection of:
  - the first point of sale if the first total time is less than the second total time, or
  - the second point of sale if the second total time is less than the first total time; and
- control the output device to output data corresponding to the selection of the first point of sale or the second point of sale.

8. The system of claim 7 wherein the ECU is further configured to determine or predict the first postponed line time and the second postponed line time based on at least one of a historical wait time, a current quantity of cars in line, a current quantity of customers in line, or a current quantity of pending orders at each of the first point of sale and the second point of sale.

9. The system of claim 1 wherein the ECU is further configured to determine or predict the first wait time based on at least one of a quantity of cars in line, a quantity of customers in line, a quantity of pending orders, a preparation time for the first desired consumable, or items contained in the first desired consumable order at the first point of sale.

10. The system of claim 1 further comprising an output device configured to output data, wherein the ECU is further configured to control the output device to output data indicating that the vehicle should depart toward the first point of sale when the first route time is within a predetermined amount of time of the first wait time.

11. A method for ordering goods by components of a vehicle, the method comprising:
- detecting, by a location sensor, a current location of the vehicle;
- receiving, by an input device, user input corresponding to a first desired consumable order from a first point of sale;
- determining or predicting, by an electronic control unit (ECU), a first wait time between ordering the first desired consumable order and a corresponding first desired consumable being available for pickup at the first point of sale;
- determining or predicting, by the ECU, a first route time corresponding to an amount of time for the vehicle to travel from the current location of the vehicle to the first point of sale;
- determining or predicting, by the ECU, a second wait time corresponding to a second desired consumable order that is similar to the first desired consumable order at a second point of sale;
- determining or predicting, by the ECU, a second route time corresponding to an amount of time for the vehicle to travel from the current location of the vehicle to the second point of sale;
- receiving or determining, by the ECU, a selection of the first point of sale or the second point of sale; and
- controlling, by the ECU, a network access device to transmit the first desired consumable order to the first point of sale or transmit the second desired consumable order to the second point of sale based on the selection when at least one of the first wait time is within a predetermined amount of time of the first route time or the second wait time is within a predetermined amount of time of the second route time.

12. The method of claim 11 further comprising:
- controlling, by the ECU, an output device to output the first wait time corresponding to the first desired consumable order at the first point of sale and the first route time;
- controlling, by the ECU, the output device to output the second wait time and the second route time;
- receiving, by the input device, the selection of the first point of sale or the second point of sale via the input device; and
- controlling, by the ECU, the network access device to transmit the first desired consumable order to the first point of sale or transmit the second desired consumable order to the second point of sale based on the selection.

13. The method of claim 11 further comprising:
- determining, by the ECU, a first total time corresponding to an amount of time from a current time until a first desired consumable corresponding to the first desired consumable order is ready and the vehicle can reach the first point of sale based on the first wait time and the first route time, and a second total time corresponding to an amount of time from the current time until a second desired consumable corresponding to the second desired consumable order is ready and the vehicle can reach the second point of sale based on the second wait time and the second route time;
- controlling, by the ECU, the network access device to transmit the first desired consumable order or the second desired consumable order to the selection of:
  - the first point of sale if the first total time is less than the second total time, or
  - the second point of sale if the second total time is less than the first total time; and
- controlling, by the ECU, an output device to output data corresponding to the selection of the first point of sale or the second point of sale.

14. The method of claim 11 further comprising:
- determining or predicting, by the ECU, a first line time corresponding to an amount of time between arriving at the first point of sale and reaching a first sale counter at the first point of sale, and a second line time corresponding to an amount of time between arriving at the second point of sale and reaching a second sale counter at the second point of sale;
- determining, by the ECU, a first total time corresponding to an amount of time from a current time until a first desired consumable corresponding to the first desired consumable order may be purchased at the first point of sale based on the first line time and the first route time, and a second total time corresponding to an amount of time from the current time until a second desired consumable corresponding to the second desired consumable order may be purchased at the second point of sale based on the second line time and the second route time;

controlling, by the ECU, the network access device to transmit the first desired consumable order or the second desired consumable order to the selection of:
the first point of sale if the first total time is less than the second total time, or
the second point of sale if the second total time is less than the first total time; and
controlling, by the ECU, an output device to output data corresponding to the selection of the first point of sale or the second point of sale.

15. The method of claim 11 further comprising controlling, by the ECU, an output device to output data indicating that the vehicle should depart toward the first point of sale when the first route time is within a predetermined amount of time of the first wait time.

16. A system for ordering goods via a vehicle, the system comprising:
a location sensor configured to detect a current location of the vehicle;
an input device configured to receive user input corresponding to a first desired consumable order corresponding to a first desired consumable from a first point of sale;
an output device configured to output data;
a network access device configured to transmit and receive data from a remote device; and
an electronic control unit (ECU) coupled to the location sensor, the input device, and the network access device, and configured to:
determine or predict a first wait time between ordering the first desired consumable order and a corresponding first desired consumable being available for pickup at the first point of sale,
determine or predict a first route time corresponding to an amount of time for the vehicle to travel from the current location of the vehicle to the first point of sale,
determine or predict a second wait time corresponding to a second desired consumable order that is similar to the first desired consumable order at a second point of sale,
determine or predict a second route time corresponding to an amount of time for the vehicle to travel from the current location of the vehicle to the second point of sale,
receive or determine a selection of the first point of sale or the second point of sale,
control the network access device to transmit the first desired consumable order to the first point of sale or transmit the second desired consumable order to the second point of sale based on the selection when at least one of the first wait time is within a predetermined amount of time of the first route time or the second wait time is within a predetermined amount of time of the second route time, and
control the output device to output an identifier of at least one of the first point of sale or the second point of sale when at least one of the first wait time is within the predetermined amount of time of the first route time or the second wait time is within the predetermined amount of time of the second route time.

17. The system of claim 16 wherein the ECU is further configured to:
control the output device to output the first wait time corresponding to the first desired consumable order at the first point of sale and the first route time;
control the output device to output the second wait time and the second route time;
receive the selection of the first point of sale or the second point of sale via the input device; and
control the network access device to transmit the first desired consumable order to the first point of sale or transmit the second desired consumable order to the second point of sale based on the selection.

18. The system of claim 16 wherein the ECU is further configured to:
determine a first total time corresponding to an amount of time from a current time until the first desired consumable is ready and the vehicle can reach the first point of sale based on the first wait time and the first route time, and a second total time corresponding to an amount of time from the current time until a second desired consumable corresponding to the second desired consumable order is ready and the vehicle can reach the second point of sale based on the second wait time and the second route time;
control the network access device to transmit the first desired consumable order or the second desired consumable order to the selection of:
the first point of sale if the first total time is less than the second total time, or
the second point of sale if the second total time is less than the first total time; and
control the output device to output data corresponding to the selection of the first point of sale or the second point of sale.

19. The system of claim 16 wherein the ECU is further configured to determine or predict the first wait time based on at least one of a quantity of cars in line, a quantity of customers in line, a quantity of pending orders, a preparation time for the first desired consumable, or items contained in the first desired consumable order at the first point of sale.

20. The system of claim 16 wherein the ECU is further configured to control the output device to output data indicating that the vehicle should depart toward the first point of sale when the first route time is within a predetermined amount of time of the first wait time.

* * * * *